United States Patent Office 3,721,541
Patented Mar. 20, 1973

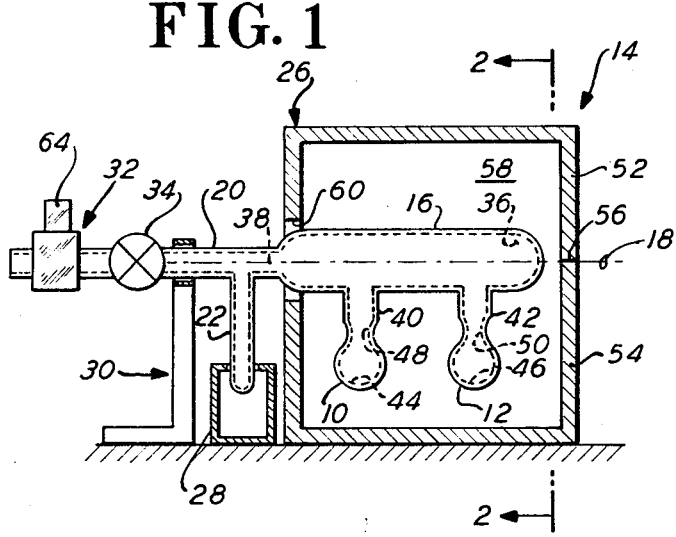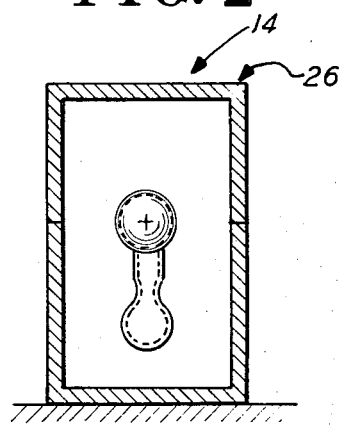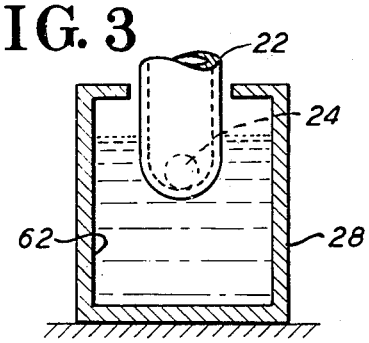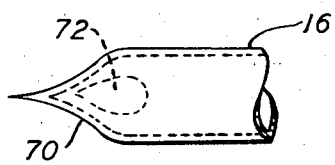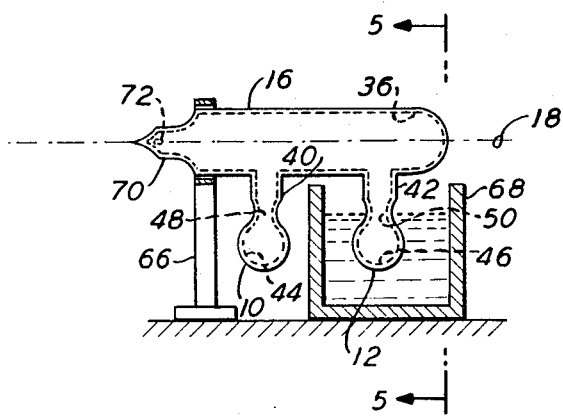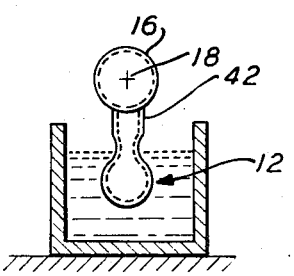

3,721,541
METHOD OF MANUFACTURE OF A NUCLEAR MAGNETIC RESONANCE CELL
James H. Simpson, Katonah, and Donald I. Shernoff, White Plains, N.Y., assignors to The Singer Company, Little Falls, N.J.
Filed July 26, 1971, Ser. No. 166,158
Int. Cl. C03c 25/02
U.S. Cl. 65—60
9 Claims

ABSTRACT OF THE DISCLOSURE

A method of manufacture of a nuclear magnetic resonance cell including, fabricating a manifold unit enclosing a chamber and having a side arm containing a deposit of mercury and having a bulb enclosing a cavity in communication with said chamber, heating said manifold unit and bulb for a predetermined time interval to a temperature approaching the softening temperature of the material of said bulb and simultaneously cooling said mercury deposit and said side arm to a temperature approaching that of liquid nitrogen and simultaneously evacuating the chamber and cavity to a relatively low pressure of about $10^{-7}$ torr vacuum, cooling said manifold and bulb to about room temperature and simultaneously gently heating the mercury in the side arm until a portion of the mercury is vaporized and distilled within the manifold chamber, separating the side arm from the manifold and bulb assembly and sealing said chamber after again evacuating the chamber and cavity to said relatively low pressure, cooling the manifold until the manifold reaches a temperature of about 25 degrees centigrade and simultaneously raising the temperature of the bulb until the bulb reaches a temperature of about 100 degrees centigrade and maintaining said temperatures for a predetermined time interval, and separating the bulb from the manifold and simultaneously sealing the bulb while simultaneously maintaining said temperatures of the manifold and bulb, and heat cycling the sealed bulb for a plurality of cycles of heating and cooling for a predetermined time interval.

---

The invention herein described was made in the course of or under a contract, or subcontract thereunder, with the Department of the Navy.

The present invention relates to a method of manufacture of a nuclear magnetic resonance cell, and particularly to a method of manufacture of a mercury nuclear magnetic resonance cell for use in a nuclear gyroscope.

The conventional nuclear gyroscope is shown and described in United States Pat. No. 3,103,620, issued Sept. 10, 1963, of inventor J. T. Fraser, which is assigned to the same assignee as this application. The conventional nuclear gyroscope includes a nuclear magnetic resonance cell having respective first, second, and third axes disposed in quadrature, coil means disposed along said first axis for generating a magnetic field, exciting means disposed along the second axis for applying an alternating field substantially at right angles to the constant magnetic field, and pickoff means disposed along the third axis for detecting precession.

The nuclear magnetic resonance cell contains an aggregate of particles, which are subjected to the steady magnetic field by the coil means along the first axis. The steady magnetic field arranges the particles so that their axes of precession are all either parallel or anti-parallel to the magnetic field, so that the common axis of precession of the particles inside the nuclear magnetic resonance cell is aligned along the first axis in the direction of the constant magnetic field, and so that the plane of instrumental rotation is disposed substantially perpendicular to said first axis of the constant magnetic field.

The relaxation time of the nuclear magnetic resonance cell is the length of time that it takes for the gradual alignment or realignment of the aggregate precessional axis of the number of freely precessing particles to the direction of the constant field along the first axis.

One problem with the conventional nuclear magnetic resonance cell is that it has a relatively short realization time.

In accordance with one embodiment of the present invention, a nuclear magnetic resonance cell is provided which has a substantially longer relaxation time than that of the conventional nuclear magnetic resonance cell. In addition, the nuclear magnetic resonance cell according to the invention has a relatively longer, useful lifetime than that of the conventional nuclear magnetic resonance cell. Moreover, the nuclear magnetic resonance cell according to the present invention provides relatively stronger signals and a relatively better signal-to-noise ratio than the conventional nuclear magnetic resonance cell. In this way, a nuclear gyroscope containing a nuclear magnetic resonance cell according to the present invention can provide more reliable and more accurate performance data than has been possible heretofore.

Accordingly, it is one object of the present invention to provide a nuclear magnetic resonance cell for use in a delicate measuring device.

It is another object of the invention to provide a nuclear magnetic resonance cell according to the above-mentioned object, wherein the nuclear magnetic resonance cell can be used in a nuclear gyroscope, wherein the size of the nuclear magnetic resonance cell is minimized, wherein the relaxation time of the nuclear magnetic cell is substantially increased, wherein the stable lifetime of the nuclear magnetic resonance cell is substantially increased, and wherein the ease of manufacture of the nuclear magnetic resonance cell is facilitated.

To the fulfillment of this and other objects, the invention provides a method of manufacture of a nuclear magnetic resonance cell including, fabricating a manifold unit enclosing a sealed chamber and having a side arm enclosing a space communicating with said chamber and having a bulb enclosing a cavity communicating with said chamber, said side arm space containing a deposit of a selected element, heating said manifold and bulb from a normal temperature of about room temperature to a predetermined relatively high temperature and simultaneously cooling side arm to a predetermined relatively low temperature for a first predetermined time interval and simultaneously evacuating said chamber and cavity and space to a predetermined relatively low pressure of substantially below atmospheric pressure, cooling said manifold and bulb to the normal temperature and simultaneously gently heating said side arm for a second predetermined time interval until a portion of the element is vaporized and is distilled within the chamber and cavity, separating said side arm from said assembly of the manifold and bulb and simultaneously sealing said chamber and cavity, and separating said bulb from said manifold and simultaneously sealing said bulb and cavity.

Other objects of the invention will become apparent upon reading the following description and accompanying drawings, wherein like parts are designated by like numerals throughout the several views, and wherein:

FIG. 1 is a sectional view of apparatus for making a nuclear magnetic resonance cell embodying features of the present invention;

FIG. 2 is a sectional view as taken along the line 2—2 of FIG. 1;

FIG. 3 is an enlarged view of a portion of FIG. 1;

FIG. 4 is a sectional view of the apparatus for making the cell during a stage of the manufacture thereof;

FIG. 5 is a sectional view as taken along the line 5—5 of FIG. 4;

FIG. 6 is an enlarged view of a portion of FIG. 4;

Figure 7:
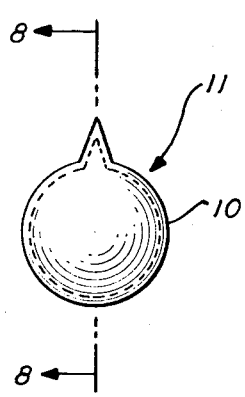
FIG. 7 is an enlarged view of the cell during another stage of the manufacture thereof.

Referring to FIG. 1, a plurality of bulbs 10, 12 which are incomplete nuclear magnetic resonance cells are shown during the first stage of manufacture thereof. Bulb 10 forms a nuclear magnetic resonance cell 11, as shown in FIG. 7, after a later stage of manufacture thereof.

In the first stage of manufacture of cell 11, a process apparatus 14 is provided. Apparatus 14, as shown in FIG. 1, includes a manifold unit 16, which has a longitudinal axis 18, and which supports the spaced incompletely manufactured bulbs 10, 12. Apparatus 14 also includes a pipe 20, which has a vertical side arm 22 that contains a quantity of mercury 24. Apparatus 14 also includes an oven 26 for heating manifold 16, a cooling unit 28 for cooling side arm 22, a support 30 for supporting pipe 20 and manifold 16, a pump 32 for evacuating manifold 16, and a valve 34 for closing manifold 16 after evacuation thereof.

Before the steps of the first stage of manufacture of the nuclear magnetic resonance cell 11 are explained, the structural details of the parts of the process apparatus are described hereafter. Manifold 16 forms a chamber 36 and pipe 20 forms a passage 38 therethrough connecting to chamber 36. Bulbs 10, 12, as shown in FIG. 1, have respective vertical tube sections 40, 42, which connect to manifold 16. Bulbs 10, 12 have respective cavities 44, 46 to chamber 36. Each of bulbs 10, 12 has a substantialy spherical shape for ease of manufacture.

Oven 26 has removable upper part 52, which is separated from a lower part 54 by a construction joint 56. Manifold 16 extends into the oven space 58 through an opening 60. Space 58 receives a heated fluid from a source (not shown) for heating manifold 16 as explained hereafter. Cooling unit 28, as shown in FIG. 3, has a chamber 62, which contains a coolant (not shown), such as liquid nitrogen, or the like, for cooling the mercury 24 in side arm 22, as explained hereafter. Pump 32 has a conventional pressure gauge 64 mounted thereon.

In the first state of manufacture, bulbs 10, 12, manifold unit 16, pipe 20 and side arm 22 are fabricated and assembled. After assembly of bulbs 10, 12, manifold unit 16, pipe 20 and side arm 22, the assembled unit is mounted on support member 30. Manifold unit 16 with bulbs 10, 12 attached thereto is disposed within oven 26. The assembly of manifold unit 16 and bulbs 10, 12 is then baked to a predetermined temperature for a predetermined period of time as explained hereafter and simultaneously therewith the bulb cavities 44, 46 and the manifold chamber 36 are evacuated by pump 32. While the manifold 16 and bulbs 10, 12 are being baked and evacuated, side arm 22 and its mercury deposit 24 are cooled to a predetermined cooling temperature as explained hereafter in order to prevent evaporation of mercury 24.

Thereafter, pump 32 is shut down, and valve 34 is closed, and oven 26 is shut down and removed so that manifold 16 and bulbs 10, 12 can be cooled to room temperature. After the manifold 16 and bulbs 10, 12 have cooled, side arm 22 and its mercury deposit 24 are heated gently so that a small portion 72 of mercury 24 is deposited, or distilled, within chamber 36 of manifold 16 at the end thereof. After the mercury portion 72 is distilled within manifold 16, the chamber 36 and cavities 44, 46 are again evacuated by opening valve 34 and activating pump 32. When chamber 36 of manifold 16 and cavities 44, 46 of bulbs 10, 12 have reached the predetermined evacuation pressure, manifold 16 is sealed at the end thereof adjacent pipe 20, and simultaneous therewith, manifold 16 and bulbs 10, 12 which form a sub-assembly, are separated from pipe 20. In this way, the first stage of manufacture of bulbs 10, 12 is completed.

In order to present more fully the first stage of manufacture, the sequence of steps of manufacture is explained hereafter in further detail.

(1) Bulbs 10, 12 are fabricated so that each bulb has a wall of substantially uniform wall thickness preferably of less than about 0.010 inch in thickness. Bulbs 10, 12 each has inner surface enclosing respective cavities 44, 46. Bulbs 10, 12 preferably have a spherical shape for ease of manufacture. The size of bulbs 10, 12 are preferably less than about ⅛ of an inch in outside diameter. The material of bulbs 10, 12 is preferably composed of a high purity vitreous silica, or the like, preferably synthetic fused quartz.

(2) Manifold unit 16 having chamber 36 and having tube sections 40, 42 is then fabricated. Bulbs 10, 12 are connected respectively to tube sections 40, 42. Tubes 40, 42 have respective conduits 48, 50, which connect respective cavities 44, 46 of bulbs 10, 12 to chamber 36 of manifold 16.

(3) Pipe 20 is fabricated and is connected to the end of manifold 16. Pipe 20 has a passage 38 which connects to chamber 36 of manifold 16.

(4) Side arm 22 is fabricated and is connected to pipe 20 so that the inside of side arm 22 communicates with chamber 36 of manifold 16. Before connecting side arm 22 to pipe 20, a deposit of mercury 24 is placed in the bottom of side arm 22. Natural mercury is used for minimizing the cost of manufacture. However, an enriched mercury isotope, including $Hg^{199}$ and $Hg^{201}$, is preferably used in order to obtain a slightly better cell performance, as explained hereafter. While mercury is the preferred element, a similar element may be chosen instead of mercury from the group of elements, including cadmium, zinc, strontium, and xenon. After the mercury 24 is placed within side arm 22, the side arm is connected to pipe 20.

(5) Pump 32 and valve 34 are connected to the assembly of pipe 20, manifold 16, side arm 22 and bulbs 10, 12. Then, the manifold unit 16 and bulbs 10, 12 are placed within oven 26. The parts 52, 54 of oven 26 can be separated along joint 56 for positioning manifold 16. Manifold 16 is then baked within oven space 58. The temperature of bulbs 10, 12 and manifold 16 is held at a temperature of about 800° centigrade to 1000° centigrade for a time interval of about 24 hours. Such temperature is relatively near the softening point temperature of the material of bulbs 10, 12, which material is synthetic fused quartz. By raising the temperature of bulbs 10, 12 to about the softening point temperature of the material thereof, the concentration of impurities on and near the inner surface of the bulbs 10, 12 is minimized.

(6) During said baking procedure of manifold unit 16 and bulbs 10, 12, the chamber 36 and cavities 44, 46 are simultaneously evacuated to a vacuum of about $10^{-7}$ torr.

(7) During said baking and evacuation of manifold 16 and bulbs 10, 12, side arm 22 and its mercury deposit 24 are held at a temperature of about liquid nitrogen. Chamber 62 of cooling unit 22 preferably contains liquid nitrogen (not shown).

(8) After the simultaneous baking and evacuation of manifold 16 and bulbs 10, 12, and the simultaneous cooling of side arm 22, the assembly of manifold 16, bulbs 10, 12, and side arm 22 is removed from oven 26 and is allowed to cool to room temperature.

(9) After said assembly reaches room temperature, valve 34 is closed thereby sealing chamber 36 of manifold 16 and cavities 44, 46 of bulbs 10, 12, while leaving the inside of side arm 22 in communication with chamber 36.

Valve 34 has a valve seat, which is composed of ground glass material in order to avoid the entry of small quantities of the mercury 24 into pump 32.

(10) Thereafter, side arm 22, which is now removed from cooling unit 28, is gently heated so that a portion of the mercury deposit 24 is distilled up into the end of chamber 36 of manifold 16 forming a mercury deposit portion 72, as shown in FIGS. 4 and 6.

(11) After the deposit of the mercury portion 72 within manifold 16, valve 34 is opened, and chamber 36 of manifold 16 is again evacuated until chamber 36 and cavities 44, 46 have been evacuated to a pressure of about $10^{-7}$ torr.

(12) After the evacuation of manifold 16, which now contains the distilled mercury portion 72, manifold 16 is sealed and is simultaneously separated from pipe 20 by sealing the end portion of manifold 16 using a torch in a conventional manner. In this way, the first stage of manufacture of bulbs 10, 12 is completed.

The second stage of the manufacture of bulbs 10, 12 is shown in FIGS. 4, 5 and 6.

In the second stage of manufacture of bulbs 10, 12 manifold 16, which is now separated from pipe 20, is mounted on a second support 66. Bulb 12 is positioned within a second cooling unit 68, which contains a cooling fluid (not shown), such as water, or the like, wherein cell 12 is immersed. Manifold 16, as shown in FIG. 6, now has a tapered end portion 70, in which is contained the mercury deposit 72. For ease of illustration, bulb 12 only is shown disposed within second cooling unit 68. Both bulbs 10, 12 can be disposed within cooling unit 68 at the same time. The same steps of manufacture are applied to bulb 10 as are applied to bulb 12.

In the second stage of manufacture of bulbs 10, 12 the manifold 16 and the bulbs 10, 12 are cooled, but the manifold 16 is cooled to a lower temperature than the bulbs 10, 12. In this way, the mercury vapor in the cavities 44, 46 reaches an equilibrium with the mercury vapor within chamber 36 of manifold 16. The preferred low temperature of manifold 16 is preferably about 25° centigrade, but at least substantially less than 100° centigrade. The preferred low temperature of bulbs 10, 12 is about 100° centigrade. With this temperature difference, the mercury vapor in the bulbs 10, 12 reaches a desired equilibrium with the mercury vapor in manifold 16. In this way, a desired density of unsaturated mercury vapor is introduced into each of the bulbs 10, 12, that is, a predetermined number of atoms of about $10^{12}$ to $10^{14}$ atoms of mercury are introduced, that is, about $10^{-10}$ moles (100 picomoles) of mercury are introduced into each of the bulbs 10, 12.

Figure 8:
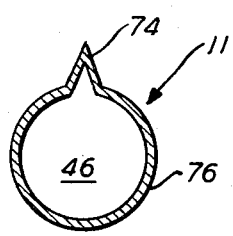
FIG. 8 is a sectional view taken along the line 8—8 of FIG. 7.

The third stage of manufacture is shown in FIGS. 7 and 8. Bulbs 10, 12 are separated from manifold 16. Bulb 10 has a small tapered portion 74 at the point of separation as shown in FIGS. 7 and 8. Bulb 10 is separated by a conventional method using a torch thereby forming cell 11. During the separation of bulb 10 from manifold 16, bulb 10 is maintained at said temperature of about 100° centigrade, and manifold 16 is still maintaining at said temperature of about 25° centigrade. In this way, the amount of deposit on or near the inner surface of cell 11 of impurities of low vapor pressure material is minimized. In addition, the unsaturated mercury vapor within cavity 46 of cell 11 remains in equilibrium with the invisible mercury portion adsorbed on the inner surface 80 of the wall 76 of cell 11.

In the next step in the third stage of manufacture, cell 11 is heated and cooled through a plurality of cycles in a predetermined manner, preferably three cycles, as indicated hereafter. Each cycle includes raising the temperature of cell 11 to about 900° centigrade, maintaining said temperature for about 5 minutes, cooling the temperature of cell 11 to about room temperature and maintaining said room temperature for about 10 minutes. In this way, an equilibrium condition between the vapor phase of the mercury in cavity 46 of cell 11 and the adsorbed phase of the mercury on the wall of cell 11 is provided, so that the magnetic and electric interactions between the atoms of the vapor and the atoms of the wall of cell 11 are minimized.

Figure 9:
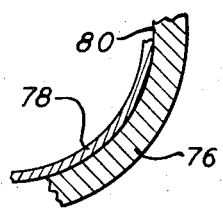
FIG. 9 is an enlarged view of a portion of FIG. 8.

After such third stage of manufacture, cell 11, as shown in FIGS. 7 and 8, has a tapered, closed point 74, and has a wall 76 of substantially uniform wall thickness. Cell 11 also has an invisible vaporized mercury portion (not shown), which is sealed within its cavity 46, and has an adsorbed invisible, mercury portion 78, or adsorbed phase, near the inner surface 80 of wall 76 which is shown as a separate layer for ease of illustration in FIG. 9.

In the manufacture of cell 11, components of a sensitive instrument are preferably combined therewith. The arrangement of cell 11 in relation to the components of the sensitive instrument, the supporting details of cell 11, and the features of the components of the sensitive instrument adjacent cell 11 are important features of the method of manufacture according to the invention.

Figure 10:
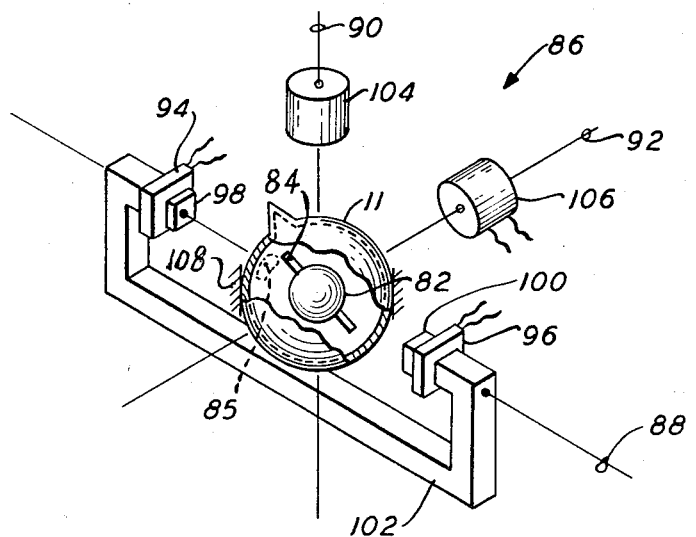
FIG. 10 is a schematic view in perspective of a nuclear gyroscope including a nuclear magnetic resonance cell embodying features of the present invention.

In the combination of cell 11 with a nuclear gyroscope 86, as shown in FIG. 10, a sphere 82 is shown which is a fanciful representation of a spinning nucleus. Sphere 82 has an axis 84, which precesses in a path 85. Cell 11 has a first axis 88, a second axis 90, which is disposed at right angles to first axis 88, and has a third axis 92, which is disposed substantially at right angles to a plane including axes 88, 90, so that axes 88, 90, 92 are in quadrature.

Nuclear gyroscope 86 includes a pair of coils 94, 96, which have respective pole pieces 98, 100 and a permanent magnet 102 that are disposed along first axis 88 for generating a constant magnetic field along axis 88. Gyroscope 86 also includes exciting means 104, which includes a coil that is energized by an oscillator (not shown) for exciting proton 82 and for effecting its precession motion along path 85. Exciting means 104 is disposed along second axis 90 substantially at right angles to axis 88. Gyroscope 86 also includes pickoff means 106, which is disposed along third axis 92. Pickoff means 106 includes detection apparatus (not shown) for sensing the change in the precession motion of nucleus 82. The details of the construction and operation of exciting means 104 and pickoff means 106 are more fully described and illustrated in the above-mentioned United States Pat. 3,103,620, issued Sept. 10, 1963.

Laboratory data of a number of typical cells, like cell 11, was obtained and is described hereafter. The characteristics of the number of mercury absorption cells were determined in a general test set up, having a prototype of a nuclear gyroscope. The decay time constant of the oscillating transient signal and its initial signal-to-noise ratio were the cell performance parameters that were determined. The bandwidth of the resonance was inversely proportional to the time constant. These were measured as a function of cell temperature and resonance frequency within the limits of the general test equipment. Representative data points were selected from the runs. The relaxation times as a function of frequency and temperature are presented in Table 1. Signal-to-noise ratios as a function of temperature are given in Table 2. In order to present as complete a picture as possible of the performance characteristics of the cells, the data from the number of cells have been combined in Tables 1 and 2. In this laboratory test program, no single cell was subjected to a full range of all tests. Cells which perform well in the first tests usually continue to perform well in a stable fashion. There was no deterioration of the desirable characteristics of cells as verified in observations continued over several months. One of the remarkable and startling observations was the persistence of the free precession signals of a typical cell of 0.40 inch outside diameter. Once initiated, the combination of the large signal-to-noise ratio and long decay time of the cell produced a signal that was observed for as long as 10 minutes. Tables 1 and 2 are presented hereafter.

TABLE 1

Relaxation Times of $^{199}$Hg and $^{201}$Hg as a Function of Frequency and Temperature

| Cell diameter (O.D.) | Cell temp., °C. | Isotope | Frequency (kHz.) | $T^2$ (sec.) |
|---|---|---|---|---|
| .4″ | 25 | 199 | 1–10 | 11 |
|  | 175 | 199 | 1 | 170 |
|  | 25 | 201 | .37 | .6 |
|  | 175 | 201 | .37 | 11 |
| .1″ | 25 | 199 | 1 | 3 |
|  | 175 |  |  | 40 |
|  | 230 |  |  | 60 |
|  | 230 | 201 | .37 | 2 |

TABLE 2

Signal-to-Noise Ratio for $^{199}$Hg and $^{201}$Hg Optically Pumped NMR Signals. S/N Is Stated For A Noise Bandwidth Of One Hertz

| Cell diameter (O.D.) | Cell temp., °C. | Isotope | Frequency (kHz.) | S/N (db at 1 Hz.) |
|---|---|---|---|---|
| .4″ | 25 | 199 | 1 | 47 |
|  |  | 201 | .37 | 47 |
| .1″ | 25 | 199 | 1 | 35 |
|  | 200 | 199 | 1 | 50 |

By using the construction details of the nuclear magnetic resonance cell according to the invention, and by using the novel method of manufacture of said cell, a nuclear magnetic resonance cell is provided for use in a delicate measuring instrument, wherein the size of the nuclear magnetic resonance cell is minimized, wherein the relaxation time of the nuclear cell is substantially increased, wherein the stable life time of the nuclear cell is substantially increased, and wherein the ease of manufacture of the nuclear cell is facilitated.

While the present invention has been described in a preferred embodiment, it will be obvious to those skilled in the art that various modifications can be made therein within the scope of the invention. It is intended that the appended claims cover all such modifications.

What is claimed is:

1. A method of manufacture of a nuclear magnetic resonance cell including,
    fabricating a manifold unit enclosing a sealed chamber and having a side arm enclosing a space communicating with said chamber and having a bulb composed of a silica material enclosing a cavity communicating with said chamber, said side arm space containing a deposit of mercury.
    heating said manifold and bulb from a temperature of about room temperature to a temperature in the range between 800 degrees centigrade to 1000 degrees centigrade and simultaneously cooling said side arm to a temperature approaching that of liquid nitrogen for a first time interval of about 24 hours and simultaneously evacuating said chamber and cavity and space to a vacuum pressure of about $10^{-7}$ torr.
    cooling said manifold and bulb to the room temperature and simultaneously gently heating said side arm for a second time interval until a portion of the mercury is vaporized and is distilled within the chamber and cavity,
    separating said side arm from said assembly of the manifold and bulb and simultaneously sealing said chamber and cavity, and
    separating said bulb from said manifold and simultaneously sealing said bulb and cavity.

2. The method of claim 1, including,
    evacuating said chamber and cavity and space during a third time interval to again obtain said pressure of about $10^{-7}$ torr vacuum after depositing the portion of the element inside the chamber and before separating the side arm from the assembly of manifold and bulb.

3. The method of claim 2 including,
    cooling the manifold in a relatively low temperature zone until the manifold reaches about 25 degrees centigrade and simultaneously heating the bulb in a relatively hot temperature zone until the bulb reaches about 100 degrees centigrade after the separation of the side arm from the manifold and before the separation of the bulb from the manifold, and
    maintaining said temperatures of the manifold and bulb until after separation of the bulb from the manifold.

4. The method of claim 3 including,
    heat cycling the sealed bulb after its separation from the manifold for a plurality of cycles of heating and cooling.

5. The method of claim 4, wherein the cycles of heating and cooling of the sealed bulb include at least two heat cycles, each cycle including, raising the temperature of the bulb to about 900 degrees centigrade, maintaining said high temperature for about 5 minutes, lowering the temperature of the bulb to about room temperature, and maintaining said low temperature for about 10 minutes.

6. The method of claim 1, wherein said bulb has an axis of symmetry and has an outer diameter of less than one-half inch.

7. The method of claim 6, wherein said mercury includes mercury isotopes.

8. The method of claim 6, wherein said bulb has a spherical outer shape and said bulb has a wall of substantially uniform wall thickness and said bulb has an outside diameter of less than one-eighth inch.

9. A method of manufacturing of a nuclear magnetic resonance cell including, fabricating a manifold unit enclosing a chamber and having a side arm containing a deposit of mercury and having a bulb composed of a silica material enclosing a cavity in communication with said chamber, heating said manifold unit and bulb for a time interval to a temperature approaching the softening temperature of the material of said bulb and simultaneously cooling said mercury deposit and said side arm to a temperature approaching that of liquid nitrogen and simultaneously evacuating said chamber and cavity to a pressure of about $10^{-7}$ vacuum, cooling said manifold and bulb to room temperature and simultaneously gently heating the mercury in the side arm until a portion of the mercury is vaporized and distilled within the manifold chamber, separating the side arm from the manifold and bulb assembly and sealing said chamber after again evacuating the chamber and cavity to said pressure of about $10^{-7}$ torr vacuum, cooling the manifold until the manifold reaches a temperature of about 25 degrees centigrade and simultaneously raising the temperature of the bulb until the bulb reaches a temperature of about 100 degrees centigrade and maintaining said temperatures for a predetermined time interval, and separating the bulb from the manifold and simultaneously sealing the bulb while simultaneously maintaining said temperature of the manifold and bulb, and heat cycling the sealed bulb for a plurality of cycles of heating and cooling.

References Cited

UNITED STATES PATENTS

| 3,537,833 | 11/1970 | Gossie et al. | 65—34 |
| 1,871,367 | 8/1932 | Hageman et al. | 117—97 |
| 1,398,033 | 11/1921 | Mawrer | 65—34 |
| 1,121,802 | 12/1914 | Clark | 117—107 |

S. LEON BASHORE, Primary Examiner

K. M. SCHOR, Assistant Examiner

U.S. Cl. X.R.

G 5—34; 117—107